US012793676B2

(12) United States Patent
Clark

(10) Patent No.: US 12,793,676 B2
(45) Date of Patent: Nov. 10, 2026

(54) STRINGED INSTRUMENT ATTACHMENT FOR GENERATING PERCUSSIVE SOUND

(71) Applicant: Richard Calvin Clark, Victoria (CA)

(72) Inventor: Richard Calvin Clark, Victoria (CA)

( * ) Notice: Subject to any disclaimer, the term of this patent is extended or adjusted under 35 U.S.C. 154(b) by 307 days.

(21) Appl. No.: 18/759,120

(22) Filed: Jun. 28, 2024

(65) Prior Publication Data

US 2025/0014539 A1 Jan. 9, 2025

Related U.S. Application Data

(60) Provisional application No. 63/524,893, filed on Jul. 4, 2023.

(51) Int. Cl.

*G10D 15/00* (2006.01)
*G10D 3/02* (2006.01)
*G10D 13/06* (2020.01)

(52) U.S. Cl.

CPC ............... *G10D 15/00* (2013.01); *G10D 3/02* (2013.01); *G10D 13/06* (2013.01)

(58) Field of Classification Search

CPC .......... G10D 15/00; G10D 3/02; G10D 13/06; G10D 1/05; G10D 13/18

See application file for complete search history.

(56) References Cited

U.S. PATENT DOCUMENTS

| | | | |
|---|---|---|---|
| 685,920 | A | 11/1901 | August |
| 729,230 | A | 5/1903 | Smith |
| 1,408,707 | A | 3/1922 | Mcgrath, Jr. |
| 1,539,961 | A | 6/1925 | Scott |
| 1,695,783 | A | 12/1928 | Stephenson |
| 1,711,386 | A | 4/1929 | Hey |
| 1,798,048 | A | 3/1931 | Ungrich |
| 1,961,900 | A | 6/1934 | Gast |
| 2,039,227 | A | 4/1936 | Korhonen |
| 2,060,357 | A | 11/1936 | Williams |
| 2,154,025 | A | 4/1939 | Born |
| 3,233,495 | A | 2/1966 | Bernardi |
| 3,314,324 | A | 4/1967 | Williams |

(Continued)

FOREIGN PATENT DOCUMENTS

| | | | |
|---|---|---|---|
| CA | 2995657 | A1 | 2/2017 |
| DE | 202015007775 | U1 | 4/2016 |

(Continued)

*Primary Examiner* — Kimberly R Lockett
(74) *Attorney, Agent, or Firm* — Knobbe, Martens, Olson & Bear, LLP

(57) ABSTRACT

Disclosed herein are various embodiments of devices and systems which may be reversibly coupled to a sound hole of a hollow-bodied stringed instrument for the generation of percussive musical sounds. Various embodiments herein disclosed comprise various means of reversibly coupling a percussive attachment with a musical instrument, and comprise adjustable device body lengths and angular orientations relative to the hollow body of musical instruments so as to allow percussive sound-generating elements coupled near each end thereof to near respective end regions of a percussive sound-generating element bridge of the percussive attachment to produce musical sounds from within a resonating chamber of the hollow-bodied instrument through interaction with an inner surface thereof.

18 Claims, 13 Drawing Sheets

(56) References Cited

U.S. PATENT DOCUMENTS

| | | | |
|---|---|---|---|
| 3,678,794 | A | 7/1972 | Tansky |
| 4,762,046 | A | 8/1988 | Aspri et al. |
| 5,567,895 | A | 10/1996 | Aspri et al. |
| 5,567,896 | A | 10/1996 | Gottschall |
| 5,581,043 | A | 12/1996 | Bowar |
| 5,900,573 | A | 5/1999 | Barnes |
| 6,040,510 | A | 3/2000 | Yaun |
| 6,369,304 | B1 | 4/2002 | Tucker |
| 6,441,293 | B1 | 8/2002 | LaBarbera |
| 6,681,661 | B2 | 1/2004 | Lalonde |
| 6,696,632 | B2 | 2/2004 | Minakuchi et al. |
| 6,861,581 | B2 | 3/2005 | Geiger |
| 7,259,308 | B2 | 8/2007 | Geiger |
| 7,847,169 | B2 | 12/2010 | Umeda |
| 8,546,673 | B2 * | 10/2013 | Peil .......................... G10D 3/00 84/453 |
| 8,969,692 | B2 | 3/2015 | Sanns, Jr. |
| 8,975,497 | B2 | 3/2015 | Aspri |
| 9,361,862 | B2 | 6/2016 | Klemarewski |
| 9,396,707 | B1 | 7/2016 | Clark |
| 9,570,051 | B1 | 2/2017 | Moore et al. |
| 9,691,363 | B2 | 6/2017 | McHugh et al. |
| 10,276,135 | B1 | 4/2019 | Purol |
| 10,566,915 | B1 | 2/2020 | Purol |
| 10,650,792 | B2 | 5/2020 | Israel |
| 10,679,590 | B2 | 6/2020 | Moore et al. |
| 11,322,120 | B1 | 5/2022 | Meyer |
| 2010/0083806 | A1 | 4/2010 | Peavey |
| 2018/0211640 | A1 | 7/2018 | Sikra |
| 2018/0268788 | A1 | 9/2018 | Moore et al. |
| 2022/0130353 | A1 | 4/2022 | Namli |

FOREIGN PATENT DOCUMENTS

| | | | |
|---|---|---|---|
| DE | 102017010359 | A1 | 5/2019 |
| WO | 2018021976 | A1 | 2/2018 |
| WO | 2021151190 | A1 | 8/2021 |

* cited by examiner

STRINGED INSTRUMENT ATTACHMENT FOR GENERATING PERCUSSIVE SOUND

CROSS-REFERENCE TO RELATED APPLICATIONS

The instant application claims the benefit of priority to U.S. Provisional Patent Application Ser. No. 63/524,893, filed Jul. 4, 2023 and entitled "Stringed instrument attachment for generating percussive sound", the disclosure of which is fully incorporated by reference.

FIELD OF THE DISCLOSURE

The present disclosure relates to musical instruments and, in particular, to a stringed instrument attachment for generating percussive sound.

BACKGROUND

Stringed instruments (chordophones) comprise one of the most common types of instruments used in recording and performing music. Typically, individual chordophones are capable of generating one type of musical sound characterised by the instrument's constituent materials and their respective geometries. While a single musician may create alternate sounds by tapping various regions of an instrument to mimic, for instance, an accompanying percussive instrument, the range of sounds available to such techniques are often limited, lacking the range of frequencies and tonalities that can be achieved by other instruments played by accompanying musicians. In particular, the distinctive high frequency rattle produced by the snare drum, an important component of a drum kit, is challenging to reproduce by a single musician, typically requiring the attachment of shakers to the musician's feet or the activation of a foot pedal to strike a snare drum.

Canadian Patent application serial number CA 2,995,657, entitled: "PERCUSSIVE DEVICE AND SYSTEM FOR STRINGED INSTRUMENT," filed Aug. 16, 2016, to ISRAEL, Y., discloses a percussive system which can be mounted on an instrument, such as a guitar. The percussive system may be mounted to a front face of the instrument, and batted by a musician to produce a percussive sound. However, while such box-like systems allow the musician to drum while playing the strings to provide percussive sounds, the movement of the musician's hands may be impeded, and the sound-producing elements may not take advantage of the instrument's hollow body that is specifically designed to provide resonance and high musical sound quality.

On the other hand, International Patent application publication number WO 2018/021976 entitled: "DEVICE FOR MAKING MUSICAL SOUNDS," filed Jul. 28, 2017, to LO, Y., discloses a device incorporated within a hollow-bodied instrument that may produce percussive sounds during instrument play. However, such systems are necessarily built into the instrument body, increasing the challenge and cost of fabrication, and overall weight of the instrument. Furthermore, while the percussive system can be disengaged to cease generation of percussive sounds, it may not be removed from the instrument, and thus can affect the musical sound resonance when percussive tones are not desired. The inherent lack of portability of a pre-installed percussive system may also limit the ability of the device to be easily or quickly installed on another instrument. Furthermore, such a permanently installed percussive system also limits the musician's choices of a particular instrument or brand thereof.

International patent application publication number WO 2021/151190 entitled: "STRINGED INSTRUMENT ATTACHMENT FOR GENERATING PERCUSSIVE SOUND", filed Jan. 6, 2021, to CLARK, Richard Calvin, discloses device which may be coupled to a sound hole of a hollow-bodied stringed instrument for the generation of percussive musical sounds. The device has a device body with first and second ends and the device and a length which may be adjustable and angular orientations relative to the hollow body of musical instruments so as to allow one or more flexible elongate percussive sound-generating elements to produce musical sounds from within a resonating chamber of the hollow-bodied instrument through interaction with an inner surface of the hollow-bodied instrument. The one or more flexible elongate percussive sound-generating elements, or snare portion, are coupled to and extend outwardly from the device body near the second end thereof and have free distal end region. The free distal end region is in biased communication with an inside surface of the hollow body.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

It would be desirable to provide a stringed instrument attachment for generating percussive sound which overcomes some of the drawbacks of known techniques and apparati, or at least, provides a useful alternative thereto. Some aspects of this disclosure provide examples of such a device.

In accordance with one aspect, there is provided a percussion apparatus for use within a resonating chamber where the resonating chamber comprises a hollow body portion having a sound hole. The percussion apparatus has a percussion apparatus body portion and a percussive sound-generating portion where the percussion apparatus body portion has a first end configured for coupling with the hollow body portion through the sound hole and a second end configured for operably coupling with the percussive sound-generating portion. The percussive sound-generating portion comprises a percussive sound-generating element bridge which has a first end region and a second end region. One or more resilient elongate percussive sound-generating elements each having a first end and a second end are coupled respectively to the percussive sound-generating element bridge near the first and second end regions of the percussive sound-generating element bridge and a portion of the one or more resilient elongate percussive sound-generating elements is, in use, able to selectively and reversibly contact an inside surface of the hollow body.

In some embodiments, the resonating chamber is a guitar, a violin, a cello, a bass, a double bass, a viola, a ukulele, a mandolin, a lute, a zither, or a banjo.

In some embodiments, the one or more resilient elongate percussive sound-generating elements is at least one of a snare wire, a snare cord, a snare cable, a wire, a string, a cord, or a cable.

In some embodiments, the percussion apparatus body portion has a length and an angular orientation such that in operation, the portion of the one or more resilient elongate percussive sound-generating elements is biased in reversible communication with the inside surface of the hollow body.

In some embodiments, the percussion apparatus body portion is coupled to the percussive sound-generating portion at a connection site. In some embodiments, the connection site comprises a pivotable joint intervening the percussion apparatus body portion and the percussive sound-generating portion. In some embodiments, the pivotable joint is configured to allow a user-defined angular orientation to the one or more resilient elongate percussive sound-generating elements such that a length of the portion of the one or more resilient elongate percussive sound-generating elements biased in reversible communication with the inside surface of the resonating chamber may be defined by a user.

In some embodiments, the connection site further comprises a means for biasing a portion of the one or more resilient elongate percussive sound-generating to be in contact with the inside surface of the hollow body. In some embodiments, the means for biasing is a spring mechanism.

In some embodiments, the length of the percussive apparatus body portion is adjustable.

In some embodiments, the angular orientation of the percussive body portion adjustable.

In some embodiments, the first end of the percussion apparatus body portion, configured for reversibly coupling with the hollow body portion, comprises a base portion and a movable plate portion for receiving therebetween an edge region of the sound hole and maintaining the percussion apparatus in a desired location within the resonating chamber by a compression fit. In some embodiments, the first end of the percussion apparatus body portion, configured for reversibly coupling with the hollow body portion, comprises a clamp operable for engaging inner and outer surfaces of the hollow body portion through the sound hole and maintaining the percussion apparatus in a desired location within the resonating chamber by a compression fit. In some embodiments, the first end of the percussion apparatus body portion, configured for reversibly coupling with the hollow body portion, comprises a biasable portion for engaging with an inner rim of the sound hole and maintaining the percussion apparatus in a desired location within the resonating chamber by a friction fit. In some embodiments, the biasable portion is compressible for insertion into the sound hole and biased to a decompressed conformation so as to exert pressure on the inner rim of the sound hole and maintain the percussion apparatus in a desired location within the resonating chamber by a friction fit.

In accordance with yet another aspect, there is provided a method for generating a percussive sound with a hollow-bodied stringed instrument having a sound hole where the method comprises reversibly coupling a percussion apparatus as disclosed herein with the hollow body portion via the sound hole.

In some embodiments, the method further comprises the user causing the portion of the one or more resilient elongate percussive sound-generating elements to separate from the inner surface and return to communication with the inner surface under the bias.

In some embodiments of the method, the method comprises the user causing the portion of the one or more resilient elongate percussive sound-generating elements to separate from the inner surface and return to communication with the inner surface under the bias is by impact or sudden movement of the resonating chamber.

BRIEF DESCRIPTION OF THE FIGURES

Several embodiments of the present disclosure will be provided, by way of examples only, with reference to the appended drawings, wherein.

Figure 1:
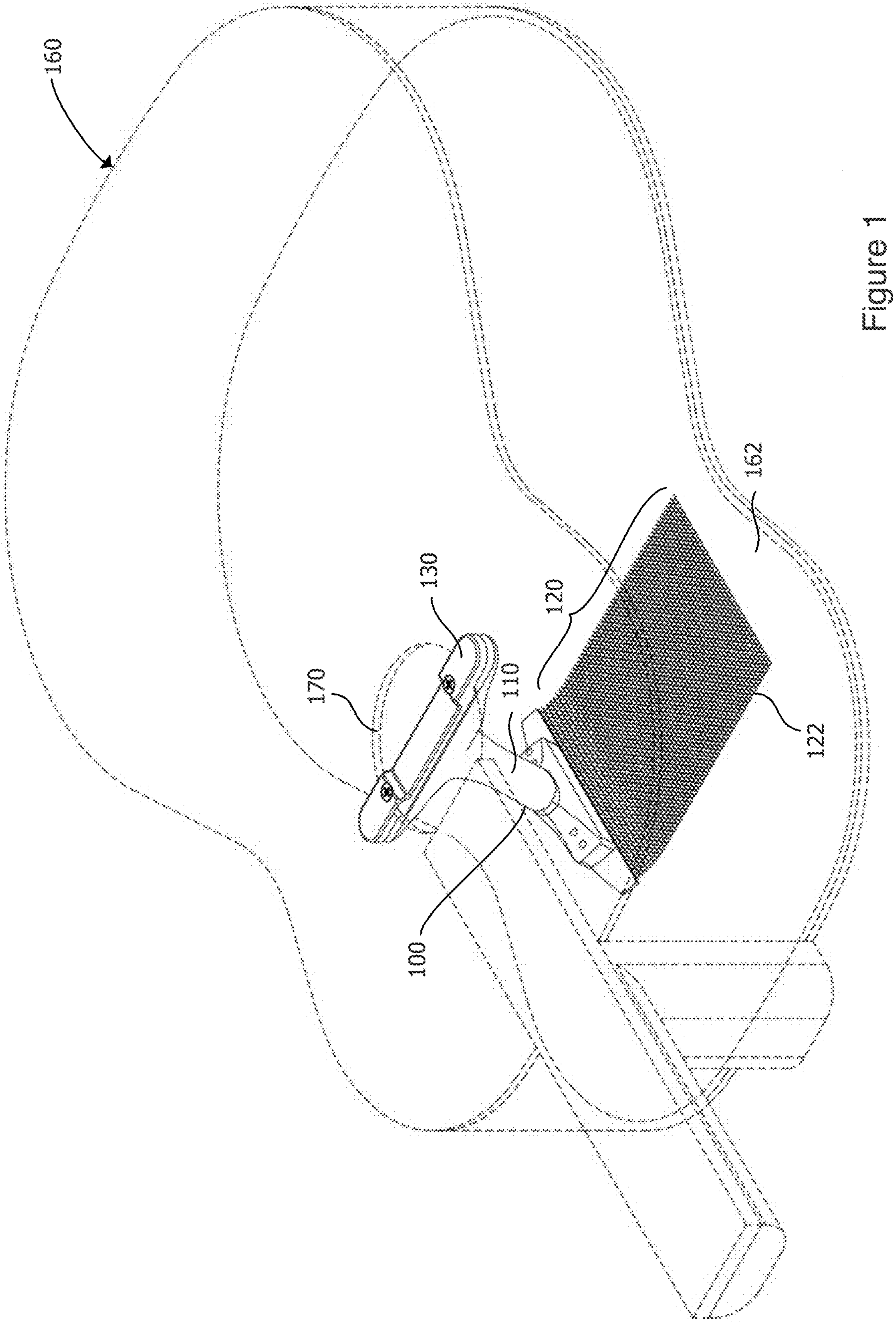
FIG. 1 is a top-side perspective view of an embodiment of an exemplary removable attachment for generating a percussive sound, located within the body of a musical instrument.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover methods or apparatuses that differ from those described below. The claimed implementations are not limited to apparatuses or methods having all of the features of any one apparatus or methods described below or to features common to multiple or all of the apparatuses or processes described below. It is possible that an apparatus or methods described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Unless defined otherwise, all technical and scientific terms used herein have the same meaning as commonly understood by one of ordinary skill in the art to which this disclosure belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "comprising" as used herein will be understood to mean that the list following is non-exhaustive and may or may not include any other additional suitable items, for example one or more further feature(s), component(s) and/or element(s) as appropriate.

The devices, systems and methods described herein provide, in accordance with different embodiments, different examples in which a stringed instrument attachment may be employed to generate percussive sounds. Such a stringed instrument attachment employed to generate percussive sounds may also herein be referred to interchangeably as a percussive attachment. In various embodiments of the disclosure, stringed instruments with which a percussive attachment may be coupled may generally be one comprising a sound hole and having at least a partially hollow body cavity. Non-limiting examples of which may include, but are not limited to, a guitar, a violin, a cello, a bass, a double bass, a viola, a ukulele, a mandolin, a lute, or a zither, or a banjo.

For simplicity, exemplary embodiments may refer to percussive sound-generating elements such as a snare wire, an array of snare wires, or a plurality of arrays of snare wires. However, the skilled artisan will appreciate that various embodiments may, alternatively or additionally, comprise other sound-generating elements, which may include, but are not limited to, one or more wires, guitar strings, snare cords, snare cables, wires, strings, cords, cables, bells, jingles, jangles, cymbals, shakers, sticks, combs, or other flexible and/or resilient elongate percussive sound generating elements, without departing from the scope of the disclosure.

With reference to FIG. 1, and in accordance with one exemplary embodiment, a stringed instrument attachment for generating percussive sounds, generally referred to using the numeral 100, will now be described. The percussive attachment 100 may generally be of a size and configuration, or may be of an adjustable size and geometry, to operably couple to a sound hole 170 of a hollow-bodied stringed instrument 160 in a reversible fashion. That is, a percussive attachment 100 requires neither to be structurally incorporated within a stringed instrument, nor require permanent modification to the instrument 160.

In various embodiments, the percussive attachment, when in use, may be coupled to the sound hole 170 of a hollow-bodied instrument via a coupling region 130 such that a body portion 110 of the percussive attachment 100 may be situated inside the hollow body of the instrument. In such embodiments, percussive sound-generating elements 120, such as a snare wire 122 or an array of snare wires, may be in biased contact with an inner surface 162 of the hollow body. In various embodiments, such a configuration of a percussive attachment inside a hollow body or resonance chamber may allow the percussive attachment 100 to utilize the resonance properties of an instrument for generating and/or enhancing musical sound. Furthermore, placement inside the body of a stringed instrument 160 may allow for freedom of movement of a musician for playing an instrument, rather than impeding the musician's motion, as may be the case if a percussive sound-generating element(s) was on an outer surface of the instrument. In accordance with various aspects, the percussive attachment may be in contact with various inner surfaces of a stringed instrument. In some embodiments, different orientations of the device may allow for a user to vary which outer surfaces of the instrument may be struck while the device is in use in order to provide, for instance, various musical sounds or tonalities.

Figure 2:
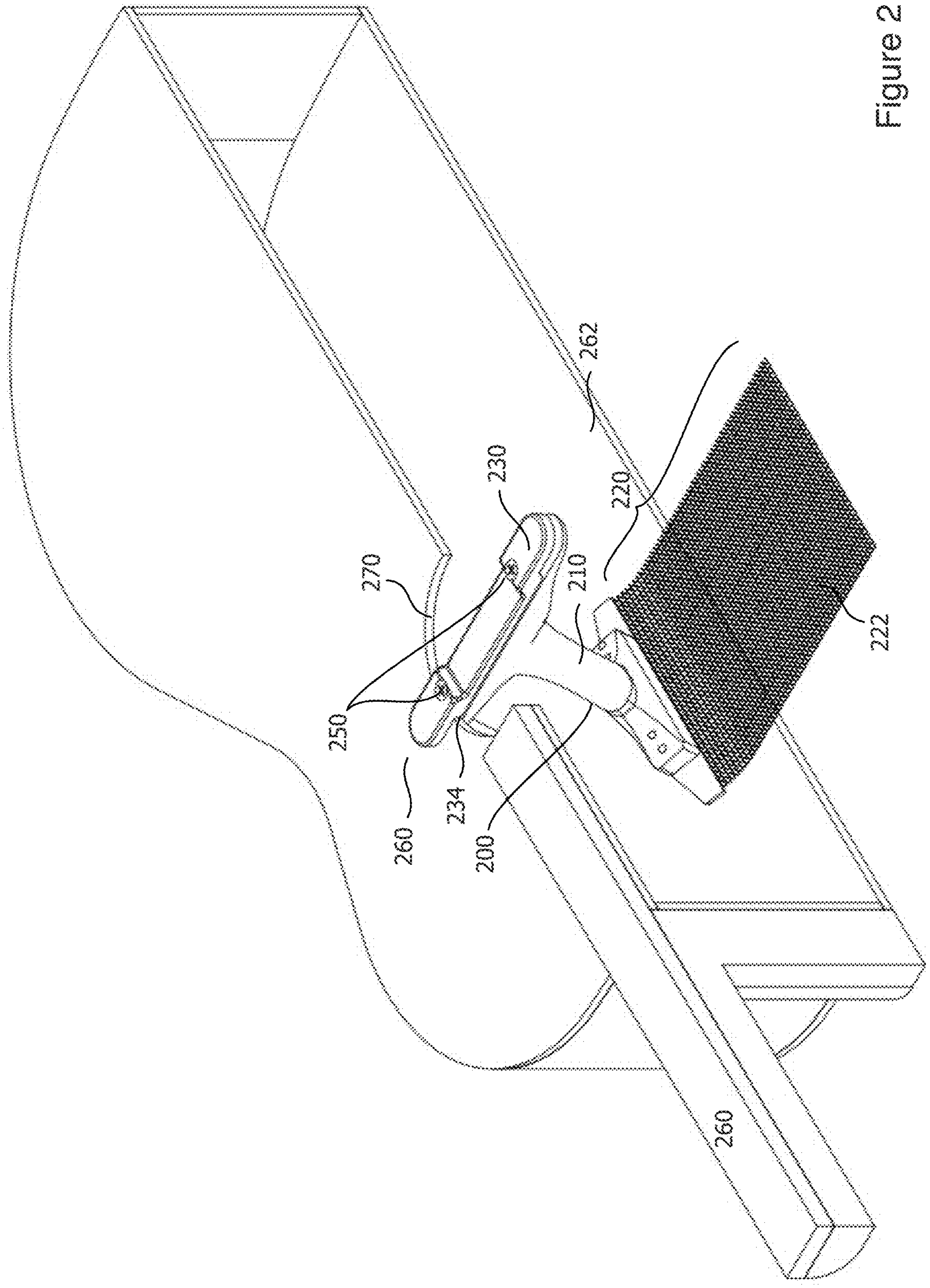
FIG. 2 is a top-side perspective cut-away view of FIG. 1 showing an embodiment in which the percussive attachment is reversibly coupled to a portion of the sound hole of a guitar.

In accordance with at least one embodiment, a percussive attachment 200 may be reversibly coupled to a guitar 260 via a sound hole 270 of the instrument, as shown schematically in FIG. 2. In accordance with various embodiments, the percussive attachment may comprise a body portion 210 extending inwardly (i.e. inside the hollow body 262 of a guitar) from the sound hole 270, and comprise an end region coupled to a percussive sound-generating element 220, a non-limiting example of which may be an array of snare wires 222. The body portion may comprise another end region 234 which, when the percussive attachment is in use, is in contact with an inner surface of the hollow body 262 at or near the sound hole 270, wherein the end region 234 may comprise a portion of the coupling means by which the percussive attachment is reversibly coupled to the guitar.

In accordance with various embodiments, the percussive attachment 200 may further comprise a moveable plate 230, or in some embodiments, also termed a fixation piece 230 configured to mate with the end region 234 or the body 210 of the percussive attachment such that, when in use, a surface of the moveable plate 230 may be in contact with a top surface 266 of the hollow body of the instrument at or near the sound hole 270. In various embodiments, the moveable plate may be mated and/or fixed to the end region 234 or body 210 via a screw mechanism, schematically shown by elements 250 in FIG. 2. In accordance with various embodiments, such a screw mechanism may comprise one or more screws that, when engaged, may cause the moveable plate 230 and the attachment body 210 to exert pressure on the body of the guitar and fix the attachment 200 in place via a compression fit. Various embodiments may allow for screws to be inserted for use with the tip pointed inwardly (towards the inside of the instrument's hollow body), or outwardly, and screws may be fixed to either the end region 234, the body 210, or the moveable plate 230. Screw mechanisms may comprise a protrusion with a threaded surface, or other screw-like mechanisms known in the art for compressing the movable plate 230 and/or end region 234 and/or body 210 on the hollow body of the instrument. Screw-like mechanisms may couple directly with a threaded through-hole in either the moveable plate 230, end region 234, or body 210, or may be fastened and/or tightened via threaded nuts.

Figure 3:
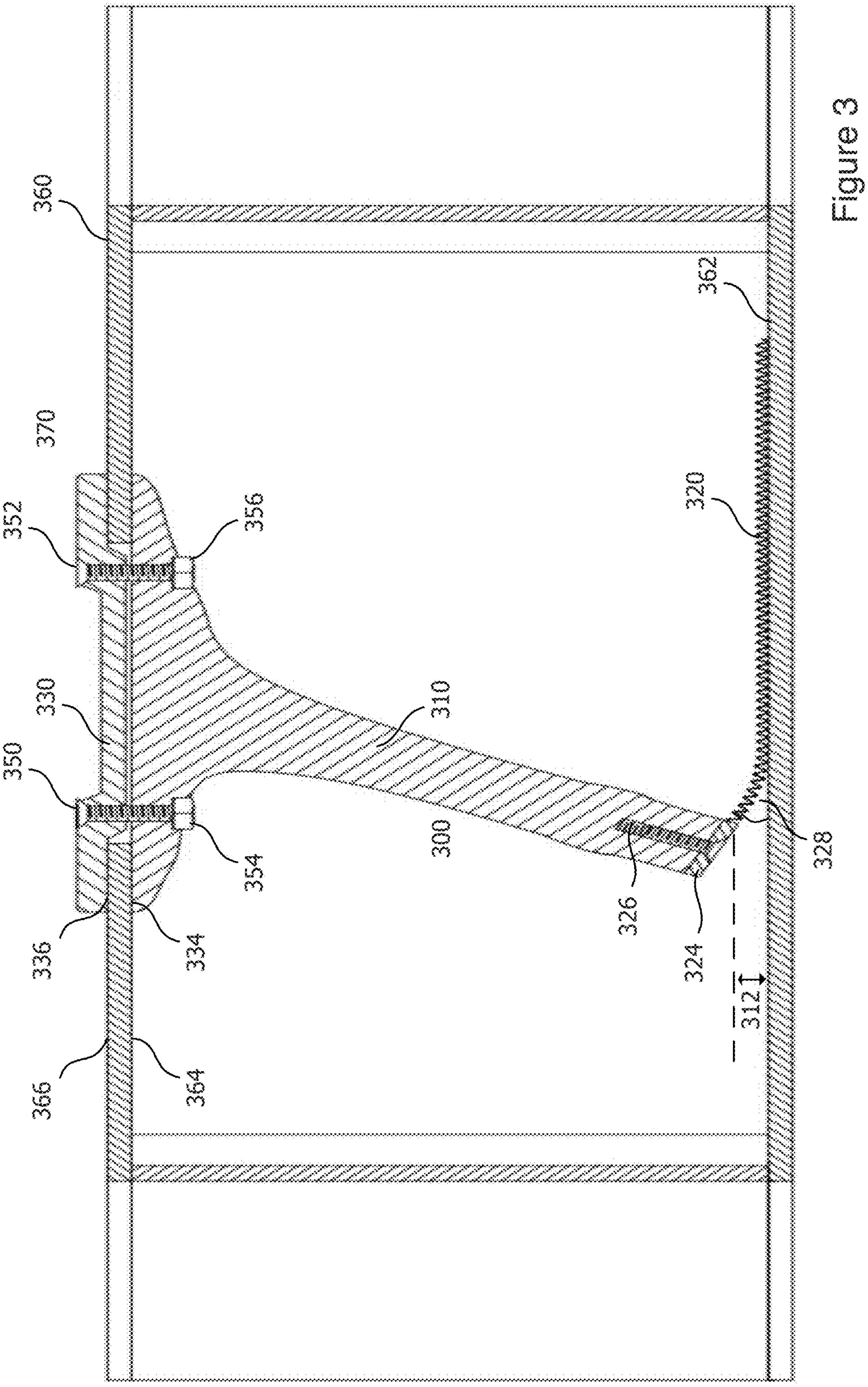
FIG. 3 is a partial cross-sectional side view of FIG. 1 showing an embodiment of a percussive attachment located within a guitar body and coupled to the sound hole of the guitar in accordance with at least one of the various embodiments.

FIG. 3 shows, in accordance with at least one embodiment, a cross-sectional view of a percussive attachment 300 reversibly fastened to the sound hole 370 of a hollow-bodied instrument 360. In accordance with various embodiments, the percussive attachment may comprise a body portion 310 extending inwardly (i.e. inside the hollow body of the instrument 360) from the sound hole 370, and comprise a distal end region 322 coupled to a percussive sound-generating element 320, such as a snare wire or array of snare wires. In this example, the percussive sound-generating element is operably coupled to the attachment body 310 via a connector site 324, which is in turn fastened to the body 310 via a screw mechanism 326, and extends away from the distal end region 322 of the body 310 at an angular orientation 328 such that a portion of the sound-generating element 320, distal to the proximal end coupled to the body, is in contact and/or biased communication with a portion of an inner surface of the hollow body 362. The skilled artisan will appreciate that various embodiments may have various connector site 324 geometries, including, but not limited to, attachments that protrude at various angles relative to an inner surface of the hollow body 362, relative to the sound hole 370 of the instrument, or relative to the attachment body 310. Furthermore, the coupling site may be fastened to the attachment body by various other means known in the art without departing from the scope of the disclosure. In other embodiments, percussive sound-generating elements may be directly coupled to the attachment body 310.

In accordance with various embodiments, neither the distal end region 322 of the body 310, nor the connector site 324 that is coupled to the percussive element(s) 320, is in contact with an inner surface of the hollow body 362, but rather at a distance 312 from the inner surface 362. In various embodiments, the distance 312 (i.e. the lack of contact with an inner surface) may improve musical sound quality arising from use of the percussive attachment, for instance by precluding "buzzing" from contact between the instrument body and the attachment 300, and thus may additionally and/or alternatively reduce the risk of damage to the attachment and/or instrument body when in use.

In accordance with various embodiments, a percussive attachment described by FIG. 3 may comprise an end region which, when the percussive attachment is in use, may comprise a region 334 in contact with an inner surface of the hollow body 364 at or near the sound hole 370. Such an end region 334 may comprise a portion of the coupling means by which the percussive attachment 300 may be reversibly affixed to the instrument 360. The percussive attachment 300 may further comprise a movable plate 330, or in some embodiments, a fixation piece 330, configured to mate with the body 310 and or end region 334 of the percussive attachment such that, when in use, a surface of the movable plate 330 may be in contact with a top surface 366 of the hollow body of the instrument at or near the sound hole 370. In various embodiments, the movable plate 330 may be mated and/or fixed to the body 310 and/or end region 340 via a screw mechanism, schematically shown by elements 350*a* and 350*b* in FIG. 3. In accordance with various embodiments, such a screw mechanism may comprise one or more screws which, when engaged, may approximate the movable plate 330 and the attachment body 310 to exert pressure on the body of the instrument and affix the attachment 300 in place for use. Various embodiments may allow for screws to be inserted for use with the tip pointed inwardly (towards the inside of the instrument's hollow body, as shown in FIG. 3), or outwardly (inverted from the screw orientation of FIG. 3), and screws may optionally be fixed to either the body 310 or the movable plate 330. Screw mechanisms may comprise a protrusion with a threaded surface, or other screw-like mechanisms known in the art for compressing the movable plate 330 and/or attachment body 310 on the hollow body of the instrument. Screw-like mechanisms may alternatively couple directly with a threaded through-hole in either the movable plate 330, end region 334 body 310, or may be fastened and/or tightened via threaded nuts, such as those shown in FIG. 3 as elements 352*a* and 352*b*. In some embodiments, the screw mechanism may comprise a single screw, or a plurality of screws, and the percussive attachment may make contact with one or more areas of the hollow body at or near the sound hole.

Figure 4:
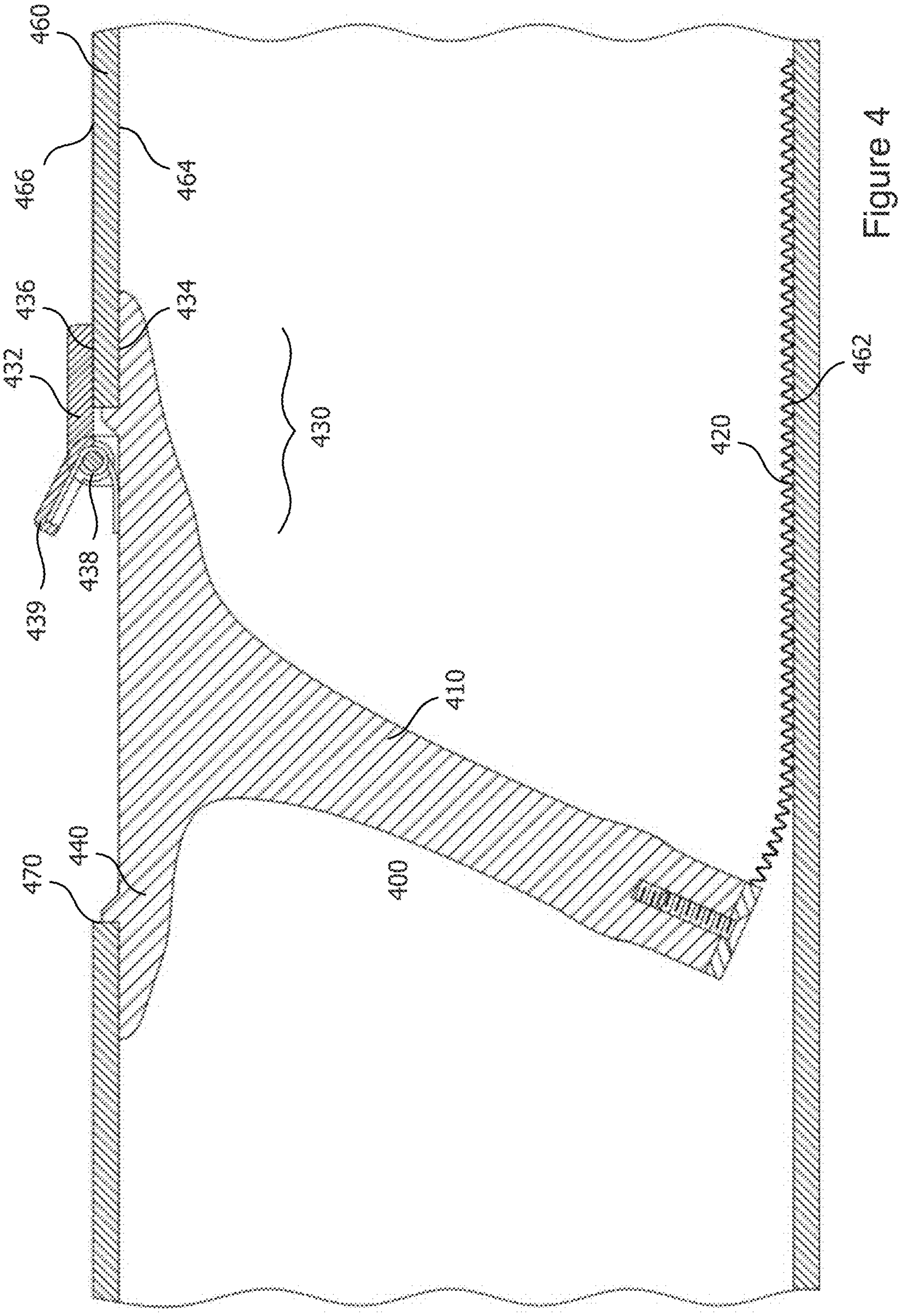
FIG. 4 is a partial cross-sectional side view of FIG. 1 showing an embodiment of a percussive attachment located within a guitar body and coupled to the sound hole of the guitar in accordance with at least one of the various embodiments.

FIG. 4 schematically illustrates an embodiment of a percussive attachment 400 reversibly coupled to the sound hole 470 of a hollow-bodied stringed instrument 460. Similar to embodiments described above, the percussive attachment comprises a body 410 extending inwardly from the sound hole 470, and may be coupled to a percussive sound-generating element 420 in biased communication with an inner surface of the hollow body 462. In accordance with at least one embodiment, reversible coupling to the sound hole 470 may be enabled by a clamping mechanism 430. In this example, a clamping mechanism may comprise a top piece 432 coupled to the attachment body 410 via a spring 438 or other similar mechanisms operable to exert a force to approximate the top piece 432 and the attachment body 410 such that an inner surface of each, 436 and 434, respectively, exert a pressure on the outer and inner surfaces of the hollow body (466 and 464 in FIG. 4, respectively) to reversibly affix the attachment to the instrument via a compression fit. In some embodiments, the clamping mechanism may be disengagable, for instance, to remove the percussive attachment 400 from the instrument 460, by compressing an lever region 439 of the top piece against a spring force. In various embodiments, the attachment body 410 may span the width of the sound hole 470, as shown in FIG. 4, wherein the body 410 comprises a second or higher order contact point at an opposing end 440 from the clamping means. Other embodiments of a percussive attachment may comprise only one-point contact at one region of or near the sound hole 470, wherein the percussive attachment may not comprise an opposing end 440.

Figure 5A:
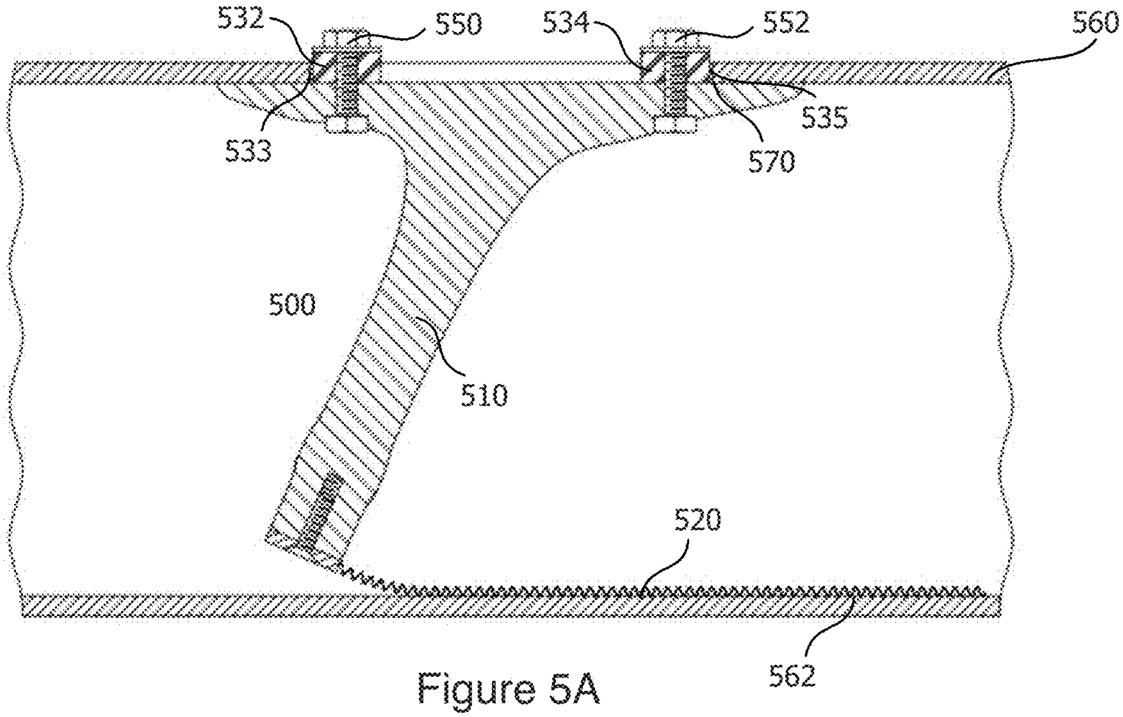
FIG. 5A is a partial cross-sectional side view of FIG. 1 of an embodiment of a percussive attachment located within a guitar body and comprising a compressingly expandable coupling means.
Figure 5B:
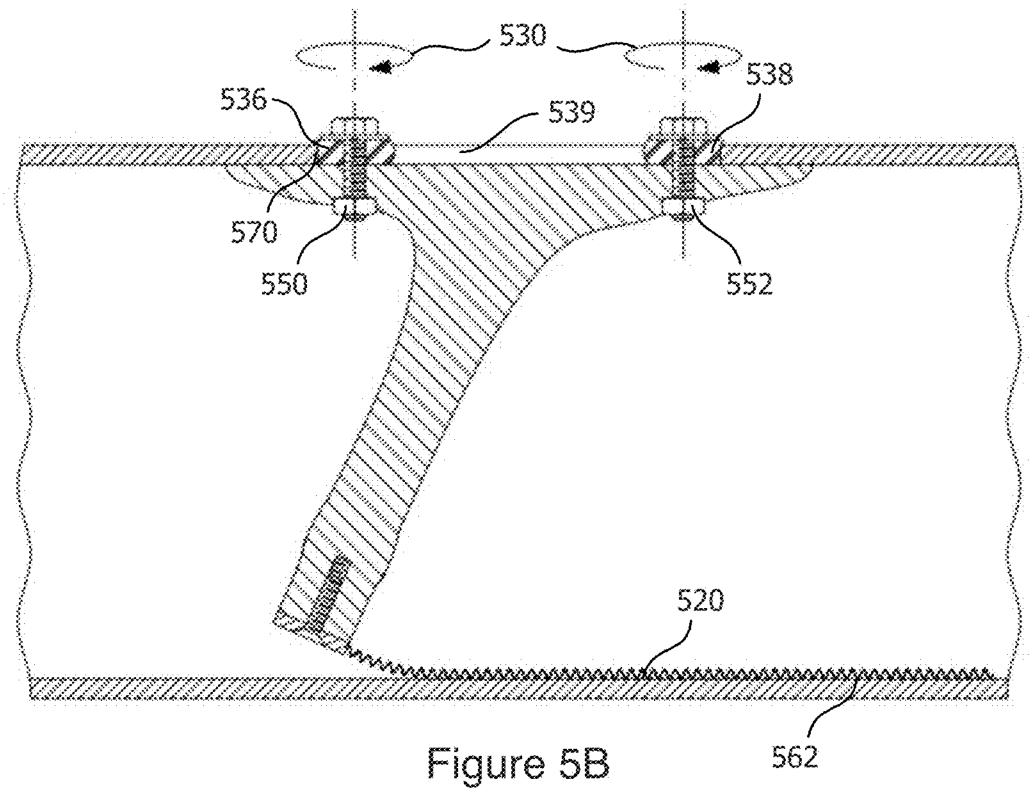
FIG. 5B is a partial cross-sectional side view of FIG. 1 showing of the embodiment of FIG. 5A wherein the coupling means is in an expanded state so as to engage with the inner rim of the sound hole of a hollow-bodied instrument.

FIGS. 5A and 5B schematically illustrate an embodiment of a percussive attachment 500 reversibly coupled to the sound hole 570 of a hollow-bodied stringed instrument 560. Similar to embodiments described above, the percussive attachment comprises a body 510 extending inwardly from the sound hole 570, and may be coupled to a percussive sound-generating element 520 in biased communication with an inner surface of the hollow body 562. In accordance with at least one embodiment, reversible coupling to the sound hole 570 may be enabled by a material which, when compressed transversally, is operable to expand radially outwards and exert a pressure against at least a portion of the inner rim of the sound hole 570. FIG. 5A shows an example of an embodiment wherein the fixation mechanism is not engaged. Two instances 532*a* and 532*b* of a resiliently compressible material are situated atop the attachment body 510 to which the instances are operably coupled via screw mechanisms 550*a* and 550*b*, respectively. In this example, the instances of a compressible material comprise gaskets which may expand radially when compressed, a non-limiting example of which may be rubber O-rings. While not engaged, the uncompressed elements 532*a* and 532*b* are separated (not engaged) or, in other words, radially retracted from the inner rim of the sound hole 570, as represented by the gaps 534*a* and 534*b* between the respective elements as shown in FIG. 5A.

Engagement of the attachment 500 with the sound hole 570 of the instrument 560 may, in various embodiments, by enabled by transversally compressing the compressible material such that it expands radially to be brought into contact with the inner rim of the sound hole 570. In FIG. 5B, this is represented by the tightening 530 of two screws 550*a* and 550*b*, which results in compressed gaskets which are radially expanded (532*a* and 532*b*, respectively) to exert a force at respective regions of the inner rim of the sound hole 570, reversibly fixing the percussive attachment in place within the instrument with the percussive sound-generating element 520 in biased communication with the inner surface of the hollow body 5621*n* various other embodiments, the compressible material may comprise one or more "handles", discs, or the like, that may be compressed radially inward, for instance manually by a user, such that the attachment is able to fit within the diameter (or other dimension) of the sound hole 570 for insertion within a hollow-bodied instrument. Upon compression of the material may expand outwards to engage the inner rim of the sound hole 570 to affix the attachment in position within the hollow body, with a percussive sound-generating element 520 in biased communication with an inner surface of the hollow body. Although not shown, in the other embodiments it is contemplated that a screw-like mechanism which spans a diameter or other dimension of the sound hole 570 may be provided and couple to the body portion of the percussive attachment, wherein the screw mechanism may be inserted within the sound hole in its collapsed state, and subsequently expanded, for instance manually by a user, such that extension of the screw mechanism exerts a force on the inner rim of the sound hole 570 to reversibly couple the attachment in position for use by a friction fit.

Figure 6:
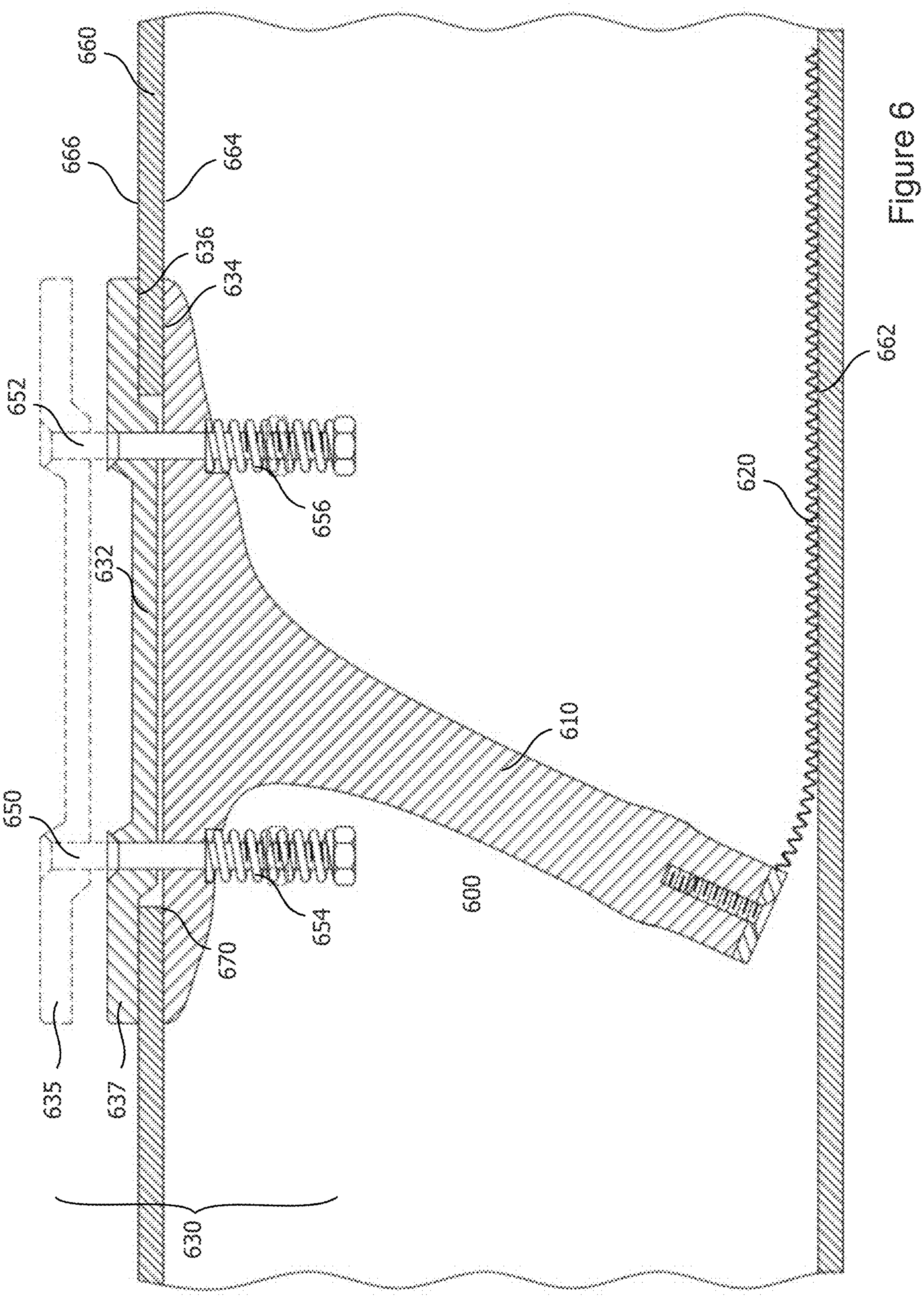
FIG. 6 is a partial cross-sectional side view of FIG. 1 of an embodiment of a percussive attachment located with a guitar body and operable to removably couple to the sound hole of a hollow-bodied instrument via a spring-based clamping mechanism in an engaged state and a disengaged state in ghost.

FIG. 6 schematically illustrates an embodiment of a percussive attachment 600 reversibly coupled to the sound hole 670 of a hollow-bodied stringed instrument 660. Similar to embodiments described above, the percussive attachment comprises a body 610 extending inwardly from the sound hole 670, and may be coupled to a percussive sound-generating element 620 in biased communication with an inner surface of the hollow body 662. In accordance with at least one embodiment, reversible coupling to the sound hole 670 may be enabled by a spring-loaded clamping mechanism 630. In this example, a spring-loaded clamping mechanism may comprise a top piece 632 coupled to the attachment body 610 via through-pins 650*a* and 650*b*, which may pass through both the attachment body 610 and the top piece 632. In this example, the through-pins 650*a* and 650*b* are additionally enringed by respective springs 652*a* and 652*b* which are operable to, under respective spring forces, approximate the top piece 632 and the attachment body 610 such that an inner surface of each, 636 and 634, respectively, exert a pressure on the outer and inner surfaces of the hollow body (666 and 664, respectively) to reversibly couple the attachment 600 at or near the sound hole 670 of the instrument via a compression fit.

In some embodiments, the clamping mechanism may be engaged or disengaged to attach or detach the percussive attachment 600 from the instrument 660 by extending the springs 652*a* and 652*b*. In some embodiments, this may be achieved by separating, as shown in ghost in FIG. 6, the top piece 632 from the body 610, for instance by a user applying an extension force manually. In an extended state 635, the percussive attachment may be added or removed from the sound hole of the instrument. In the compressed state 637, under the natural spring force, the attachment may be reversibly coupled to the instrument 660 for use with the attachment body 610 in place within the instrument with the percussive sound-generating element 620 in biased communication with the inner surface of the hollow body 662. In various embodiments, through-pins 650*a* and 650*b* may comprise, but are not limited to, any one, a combination, or a combination of features, of any one or more of a rigid unthreaded cylinder with end regions broader than the diameter of the cylinder, a screw and nut, or other means known in the art that may contain along or throughout a length of a cylindrical region the end piece 632, the attachment body 610, and any springs employed to enable a self-clamping of the attachment at or near the sound hole of the hollow body.

Figure 7A:
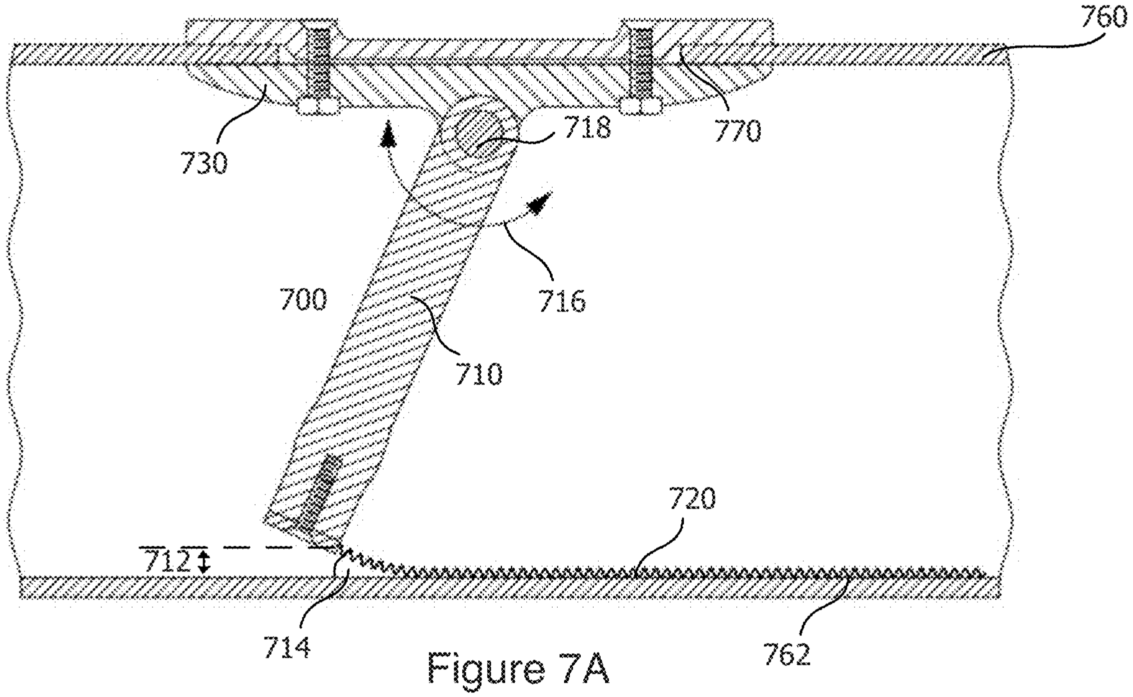
FIGS. 7A and 7B are partial cross-sectional side views of FIG. 1 showing embodiments of a percussive attachment located with a guitar body and with a pivotable end region at different angular orientations relative to a hollow-bodied instrument.
Figure 7B:
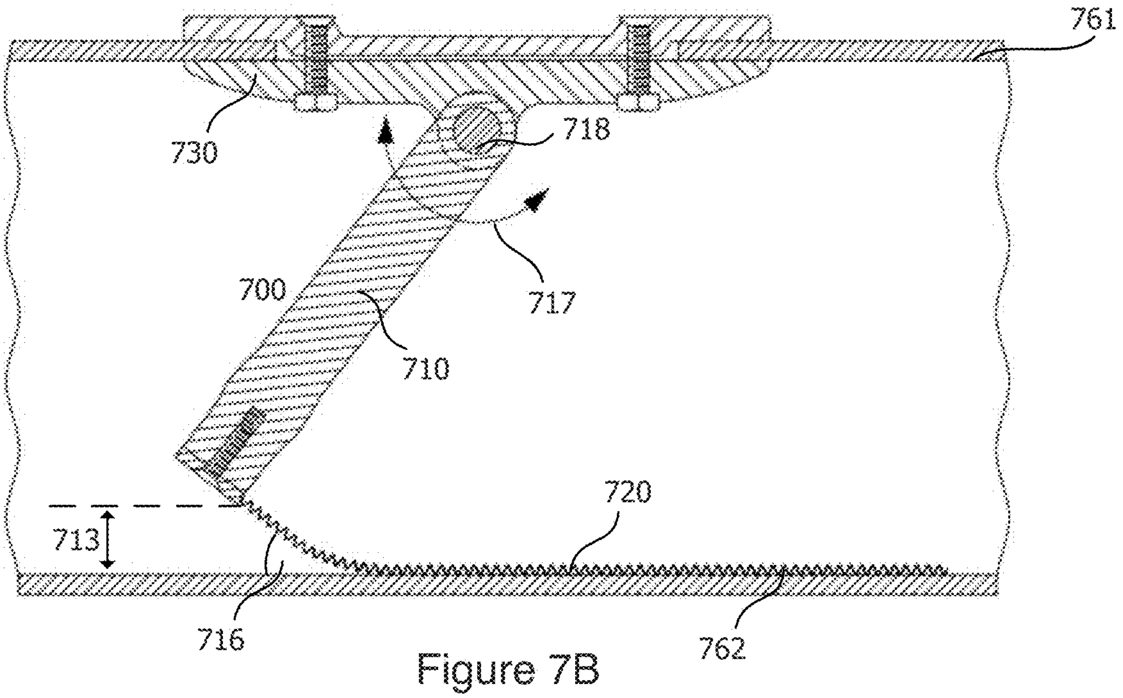

In accordance with various embodiments, FIGS. 7A and 7B are schematic cross-sectional views of a percussive attachment 700 reversibly fastened to the sound hole 770 of a hollow-bodied instrument 760. In this example, reversible coupling to the instrument may be implemented as with any of the abovementioned coupling means, represented in FIGS. 7A and 7B by a coupling region 730. The percussive attachment may comprise a body portion 710 extending inwardly (i.e. inside the hollow body of the instrument 760) from the sound hole 770, and further comprise a distal end region coupled to a percussive sound-generating element 720. In various embodiments, the body portion 710 may be coupled to the coupling region 730 of the attachment via an adjustable hinge mechanism 718, which enables the body portion 710 to pivot and/or rotate in one or more dimensions within the hollow body of the instrument as shown at 717. In FIG. 7A, the angular orientation 714 of the body 710 relative to the coupling region 730 is such that the distal end of the body 710 coupled to the percussive sound-generating element(s) is at a distance 712 from an inner surface 762 of the instrument, with the percussive sound-generating element 720 extending from the distal end region of the body 710 to an inner surface 762 of the hollow body at an angular orientation 714.

FIG. 7B shows the embodiment of FIG. 7A, wherein the angular orientation 714 of the attachment body 710 relative to the coupling region 730 has been adjusted via the hinge mechanism 718. In this example, the spacing between the distal end of the body 710 coupled to percussive sound-generating elements is a distance 713 from an inner surface of the hollow body 762, resulting in a corresponding change in angular orientation 714 between the percussive sound-generating element 720 and the inner surface of the instrument body as compared to that in FIG. 7A. In accordance with various embodiments, the angular orientation 714 of the body 710 of the percussive attachment 700 may be adjusted via a pivotable hinge mechanism 718 in order to accommodate instruments 761 of various sizes and/or hollow-body depths. Furthermore, adjusting the angular orientation 714, and/or the distance 712/713 and corresponding angle 714 between the distal end of the body 710 and an inner surface of the hollow body 762, may allow for adjustment of the musical sound produced by the percussive attachment 700 when in use.

Figure 8A:
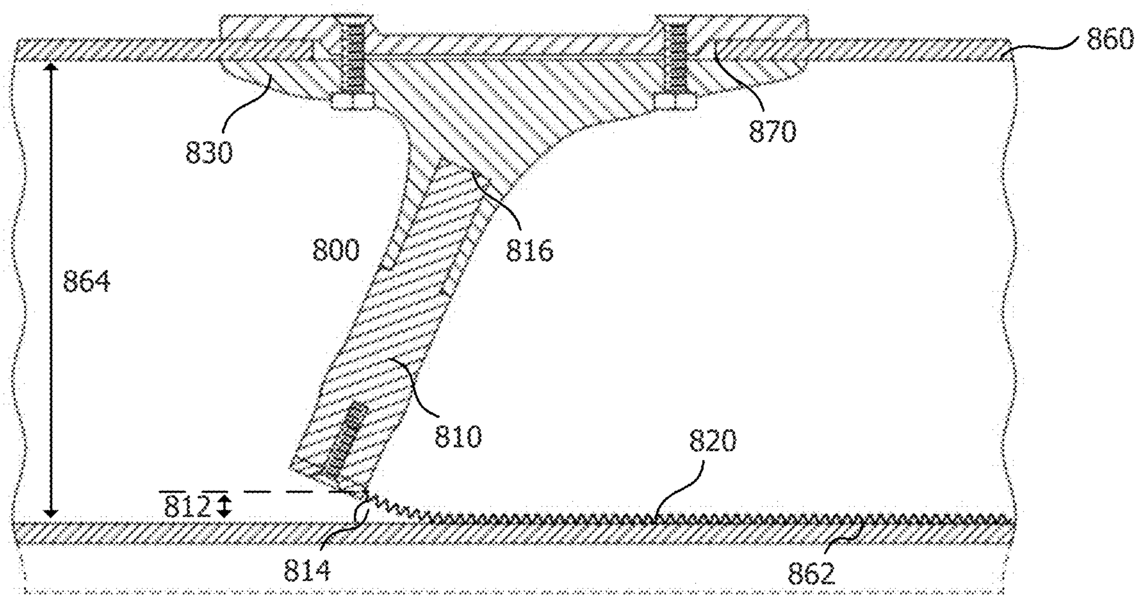
FIGS. 8A and 8B are partial cross-sectional side views of FIG. 1 showing embodiments of a percussive attachment located within a guitar body with a telescopic body portion at different extension states.
Figure 8B:
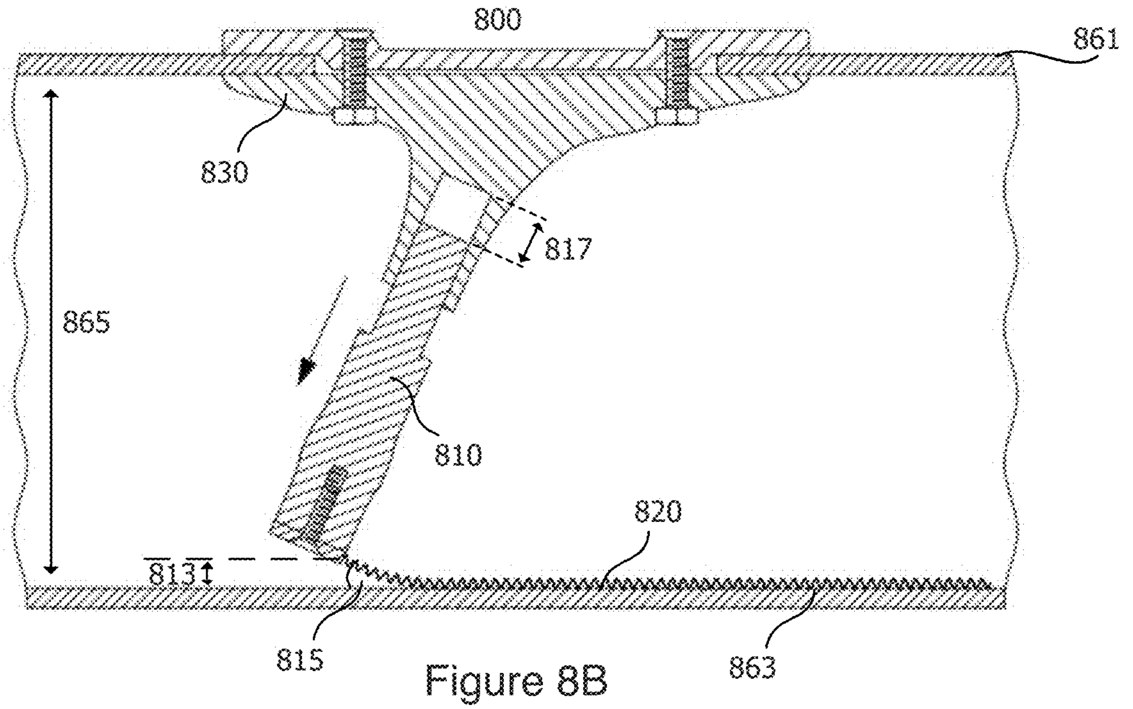

In accordance with various embodiments, FIGS. 8A and 8B are schematic cross-sectional views of a percussive attachment 800 reversibly fastened to the sound hole 870 of a hollow-bodied instrument 860. In this example, reversible coupling to the instrument may be implemented as with any of the abovementioned or similar coupling means, represented in FIGS. 8A and 8B by a coupling region 830. The percussive attachment may comprise a telescopic body portion 810 extending inwardly (i.e. inside the hollow body of the instrument 860) from the sound hole 870, and further comprise a distal end region 816 coupled to a percussive sound-generating element 820. In various embodiments, the telescopic body portion 810 may be coupled to the coupling region 830 of the percussive attachment 800 via a telescopic joint, wherein the telescopic body portion 810 may translate distally or proximally relative to the coupling region 830 within the hollow body of the instrument 860. In FIG. 8A, the telescopic joint is in a collapsed state 818, resulting in the distal end of the telescopic body 810 coupled to the percussive sound-generating element(s) to be at a distance 812 from an inner surface 862 of an instrument with a hollow body depth "D". In this example, the percussive sound-generating element 820 extends from the distal end of the telescopic body 810 to meet the inner surface 862 of the instrument at an angular orientation 814.

FIG. 8B shows the embodiment of a percussive attachment 800 of FIG. 8A, wherein the telescopic attachment body 810 is in an extended state, having been translated distally by a distance 819 from the coupling region 830, extending the overall length of the percussive attachment 800. In this example, the spacing between the distal end of the telescopic body 810 coupled to percussive sound-generating elements 820 is a distance 813 from an inner surface of the hollow body 862, wherein the hollow body has a depth "D". Here, the musical instrument 861 to which the percussive attachment is reversibly coupled has a deeper hollow body than the instrument of FIG. 8A, resulting in similar distance 813 to element 812 of FIG. 8A and angular orientation 815 of the distal end 816 of the telescopic body relative to the inner surface 863 as compared to 814 of FIG. 8A. In various embodiments, the telescopic body may be extended/collapsed to maintain an optimal distance and angular orientation for use with instruments of different geometries. Alternatively, in accordance with other embodiments, the telescopic body may be extended/inserted to provide different musical tones and/or sound quality generated by the percussive attachment 800 for instruments of similar sizes, or a single instrument, as well as to disengage the percussive sound-generating element 920 from contact with the instrument.

In accordance with various embodiments, complete disengagement of a percussive attachment from a musical instrument may not be necessary to cease generation of percussive sounds. For instance, percussive sound-generating elements may still be in contact with an inner surface of a hollow-bodied instrument, but oriented such that a percussive sound is not generated upon, for instance, a musician striking the instrument. Alternatively, percussive sound-generating elements may be muted or otherwise altered in volume or musical tone by, for instance, being pressed against a damper, in accordance with various aspects.

Figure 9:
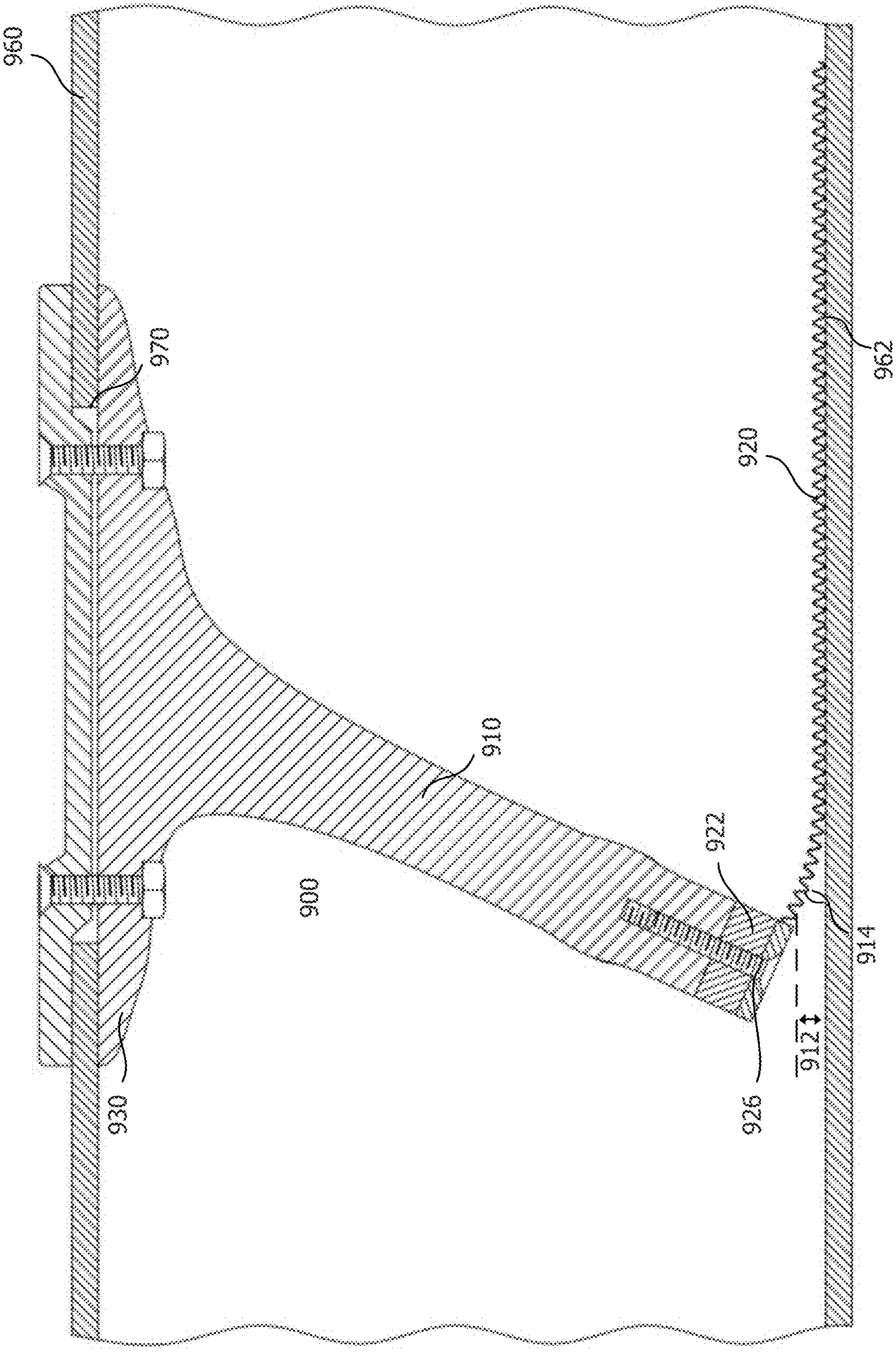
FIG. 9 is a partial cross-sectional view of FIG. 1 showing an embodiment of a percussive attachment located within a guitar body having a connecting region for coupling with and conferring a designated angular orientation to percussive sound-generating element having attached to the body portion and extension mechanism.

In accordance with various embodiments, FIG. 9 shows a schematic cross-sectional view of a percussive attachment 900 reversibly fastened to the sound hole 970 of a hollow-bodied instrument 960 via a coupling region 930. In accordance with various embodiments, the percussive attachment may comprise a body portion 910 extending inwardly (i.e. inside the hollow body of the instrument 960) from the sound hole 970. In this example, the distal end region of the attachment body is coupled to a percussive sound-generating element 920, such as a snare wire or array of snare wires, via a connector region 922. A connector region 922, in accordance with various embodiments, may comprise one or more connector blocks 924, a connector plate 926, or the like, having a plurality of lengths to which percussive sound-generating elements may be coupled in order to confer a designated angular orientation 914 and/or separation 912 between an inner surface 962 of the musical instrument and the distal end of the percussive attachment. In various embodiments, the connector region 922 may be telescopic and/or rotatable via (not shown) a hinge mechanism to further control percussive attachment-to-inner surface distance 912 and/or angular orientation 914 while maintaining a distal end of the percussive sound-generating elements 920 in biased communication with the hollow body. A connector region may, in some embodiments, comprise, for example as shown in FIG. 9, a spacer 924 that extends the length of the percussive attachment to maintain a designated distal body end-to-inner surface distance for a range of instrument depths. Connector regions may, in some embodiments, be fixed to the body 910 of the attachment via a screw mechanism 928, or other means that will be appreciated by the skilled artisan. The skilled artisan will also appreciate that various embodiments may have various connector region 922 geometries, including, but not limited to, attachments or surfaces that protrude at various angles relative to an inner surface of the hollow body 962, relative to the sound hole 970 of the instrument, or relative to the attachment body 910, and that the coupling region may be fastened to the attachment body by various means known in the art without departing from the scope or spirit of the disclosure.

Figure 11:
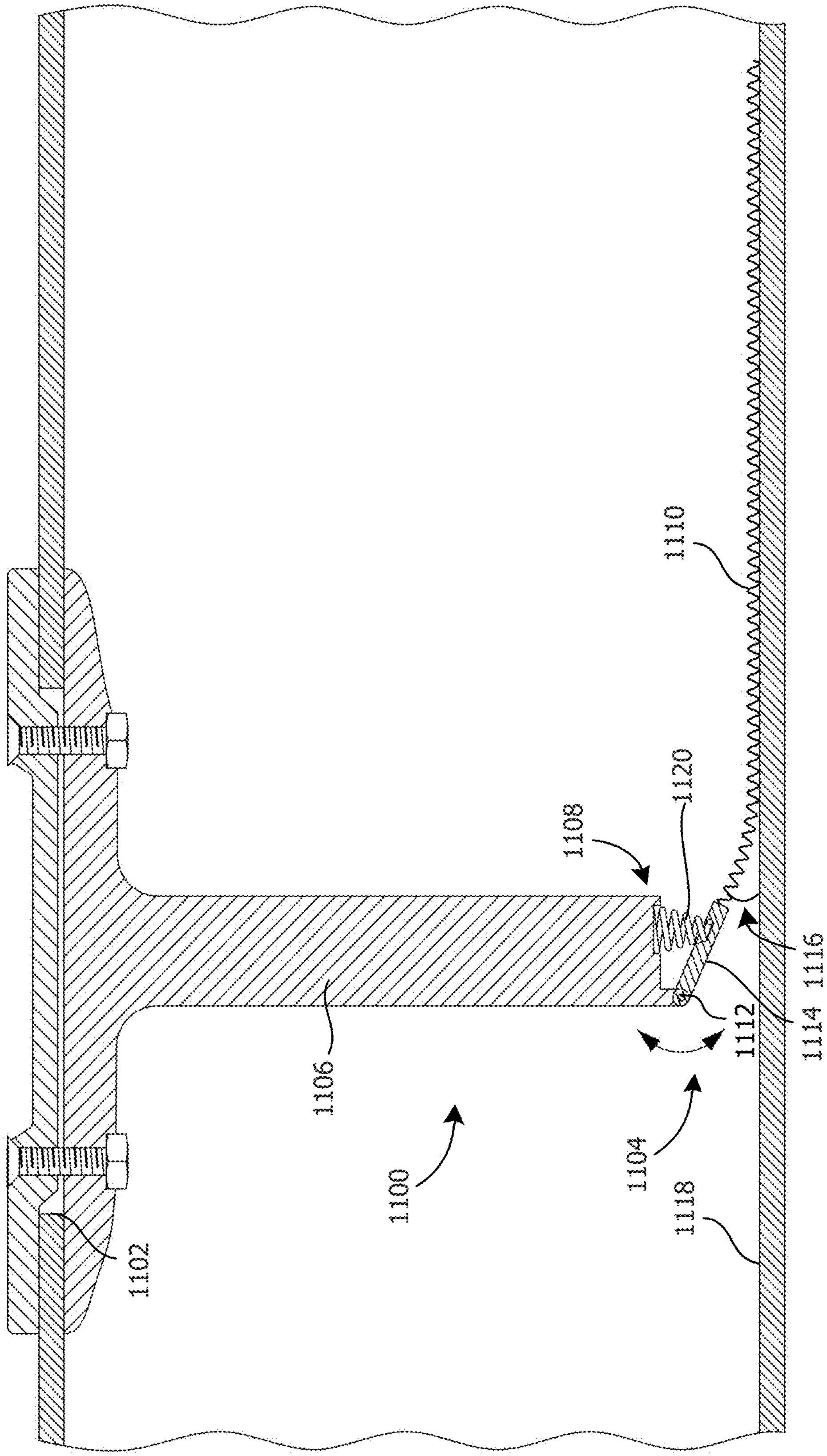
FIG. 11 is a partial cross-sectional view of an exemplary embodiment of a percussive attachment located within a guitar body and comprising a pivotable connector region and an exemplary biasing means, in accordance with various embodiments.

For instance, and in accordance with other embodiments, FIG. 11 shows a schematic cross-sectional view of a percussive attachment 1100 reversibly coupled with the sound hole 1102 of a hollow-bodied instrument and comprising a pivotable connector region 1102. In this exemplary embodiment, the percussive attachment 1100 comprises a body portion 1106 extending inwardly (i.e. inside the hollow body of the instrument) from the sound hole 1102, with the distal end region 1108 of the attachment body 1106 coupled with a percussive sound-generating element 1110 (e.g. a snare wire or array of snare wires) via the pivotable connector region 1104. The pivotable connector region 1104, in accordance with various embodiments, may comprise a pivot or hinged joint 1112. In another embodiment, the pivot joint 1112 may be configured to pivotably mate with a corresponding component of an attachment plate 1114, the attachment plate 1114 in turn coupled, at a distal end thereof, with sound generating element(s) 1110, as schematically depicted in FIG. 11. It will be appreciated that the pivotable connector region 1104 may comprise one or more of various alternative pivot joints 1112, or otherwise flexible joints known in the art for providing a controllable or variable angular orientation shown at 1116 between an inner surface 1118 of the hollow-bodied instrument and the percussive sound-generating element(s) 1110, without departing from the general scope and nature of the disclosure. For instance, the pivot joint 1112 may comprise a pivot screw, a hinge, a ball and socket, flexible sheet, or the like, configured to pivotably couple the distal end 1108 of the attachment body 1106 with, for instance, the attachment plate 1114.

In accordance with some embodiments, the angular orientation 1116 of the proximal end of sound-generating element(s) 1110 with respect to the inner surface 1118 of the hollow body may be established and/or maintained by a biasing means, for example a spring force. For instance, and in accordance with one embodiment, and as shown in FIG. 11, the attachment plate 1114 may be coupled to a distal end region 1108 of the attachment body 1106 at pivot point 1112 and the distal end of the attachment plate 1114 biased away from the distal end region 1108 by a spring mechanism 1120. Accordingly, while the percussive sound-generating element 1110 and/or attachment plate 1114 may pivot about a pivot joint 1112 relative to the attachment body 1106 (e.g. during use, or in establishment of an attachment configuration to confer a designated angular orientation 1116), a spring 1120 or like mechanism 1120 may provide a restoring force to, for instance, establish or reestablish angular orientation 1116. In accordance with various embodiments, the biasing means 1120, shown for simplicity in FIG. 11 as a spring mechanism 1120, may further provide a spring force to maintain or reestablish contact between the sound-generating element 1110 and the inner surface 1118 of the hollow-bodied instrument when in use (i.e. push the elements 1110 against the surface 1118 of the instrument). Accordingly, a spring 1120 may comprise a designated length and biasing force selected based on, for instance, the system configuration (e.g. attachment 1100 length, instrument dimensions, or the like), to provide a designated angular orientation 1116 of sound-generating elements 1110 relative the inner surface 1118 when the attachment 1100 is reversibly or permanently installed. Similarly, a spring mechanism 1120 may be selected based on a desired spring force to be applied to percussive elements 1110 or attachment plate 1114 coupled therewith, for instance to affect a sound volume or quality during operation. It will be appreciated that, in accordance with various embodiments, a spring mechanism 1120 may be coupled with various components (e.g. distal end region 1108, attachment plate 1114) at various locations thereon relative to pivot joint 1112 so to provide a designated spring force and/or system geometry (e.g. positioned nearer to/farther from pivot joint 1112, thereby tuning system geometry and corresponding leverage on percussive elements 1110).

The skilled artisan will therefore appreciate that a spring mechanism or biasing means may comprise various materials (e.g. metal, plastic, rubber), material properties (e.g. spring constant, anti-corrosiveness), configurations (e.g. number of coils in a spring), or the like, based on, for instance, a desired sound output or quality. Similarly, it will be understood that coupling between elements in the pivotable region 1114 (e.g. pivot joint 1112, distal region 1108, attachment plate 1114, sound-generating elements 1110, etc.) may be established by various means, non-limiting examples of which may include soldered joints, friction fits, adhesive, spring forces, or the like. Further, it will be understood that various embodiments of an attachment 1100 comprising a pivotable region 1104 may further comprise various other percussive attachment aspects herein disclosed, such as telescopic body portions, various means of attachment to the sound hole of an instrument, or the like, without departing from the general scope and nature of the disclosure. Similarly, it will be appreciated that while the percussive attachment 1100 having a pivotable region 1104 comprises a configuration wherein the body 1106 extends inwardly from the sound hole 1102 approximately perpendicularly to the sound hole 1102 or inner surface 1118, various other angular configurations of the attachment body 1106 relative to the sound hole 1102 are herein contemplated. For instance, a pivoting percussive attachment 1100 may be configured such that the body 1106 extends inwardly from the sound hole 1102 at an angle relative to a normal of the sound hole surface, as shown, for example, by the orientation of the body 910 of the attachment 900 in FIG. 9.

Figure 10:
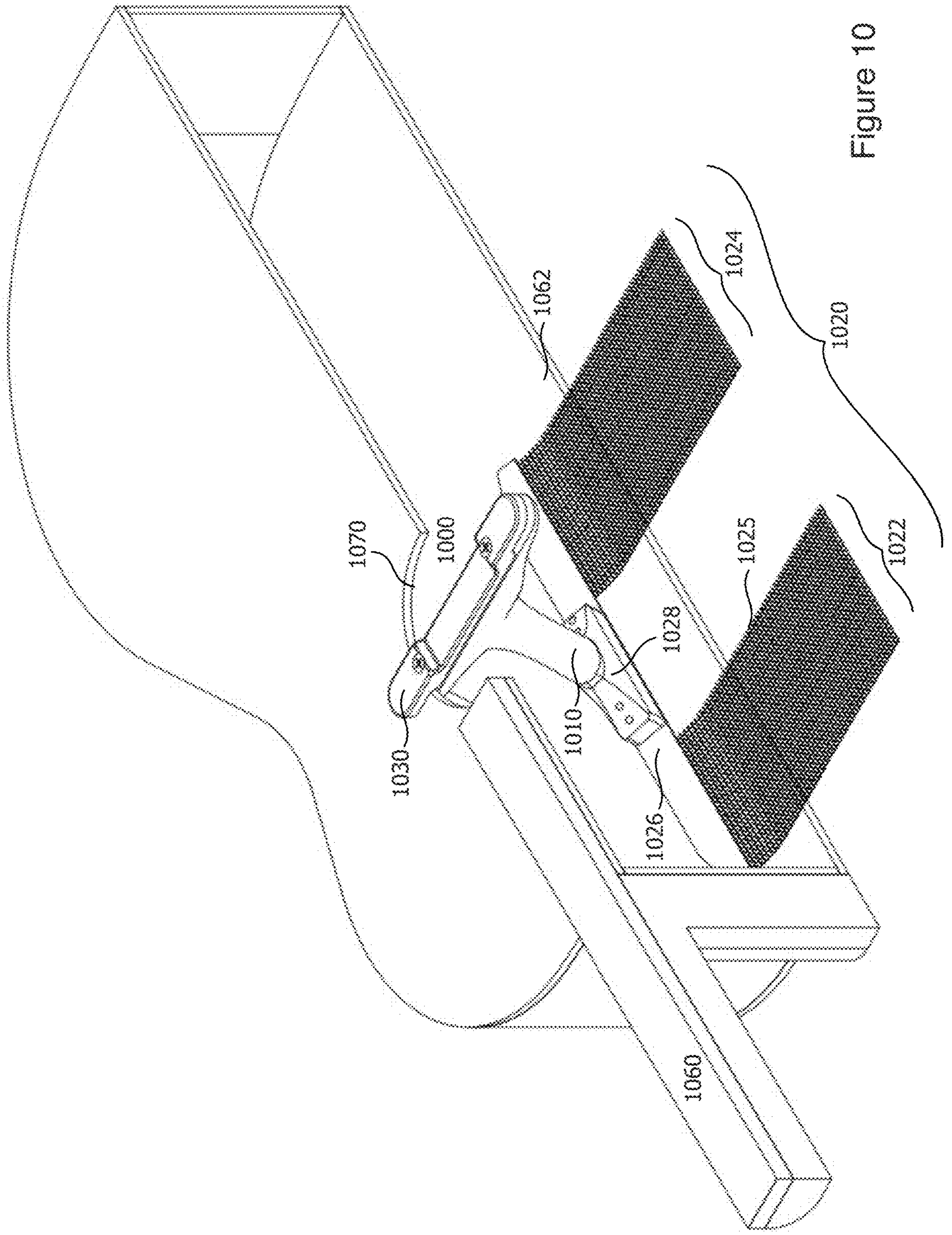
FIG. 10 is a cross-sectional view of an embodiment of a percussive attachment located within a guitar body comprising an array of sound-generating elements.

In accordance with at least one embodiment, a percussive attachment 1000 may be reversibly coupled to a sound hole 1070 of a guitar 1060 via a coupling region 1030, as shown schematically in FIG. 10. In accordance with various embodiments, the percussive attachment may comprise a body portion 1010 extending inwardly (i.e. inside the hollow body 1062 of a guitar) from the sound hole 1070 and comprise a distal end region coupled to an array of percussive sound-generating elements 1020. In FIG. 10, the array of percussive sound-generating elements comprises two sub-arrays 1022 and 1024 of snare wires 1025. In some embodiments, in each sub-array, the percussive sound generating elements 1022 an 1024 may be different so a produce different sounds. In this example, the array is coupled to the attachment body 1010 via a first coupling to a plate 1026, which is in turn coupled to the distal end of the attachment body via a connector region 1028. The geometries of the attachment body 1010, the connector region 1028, and the coupling plate 1026, as well as the coupling angle between the snare wires 1026 and the connector plate, may confer a designated angular orientation to the snare wires relative to the to an inner surface 1062 of the guitar, while maintaining a distal end of the snare wires in biased communication with the surface 1062 for use in generating percussive sounds.

Figure 12:
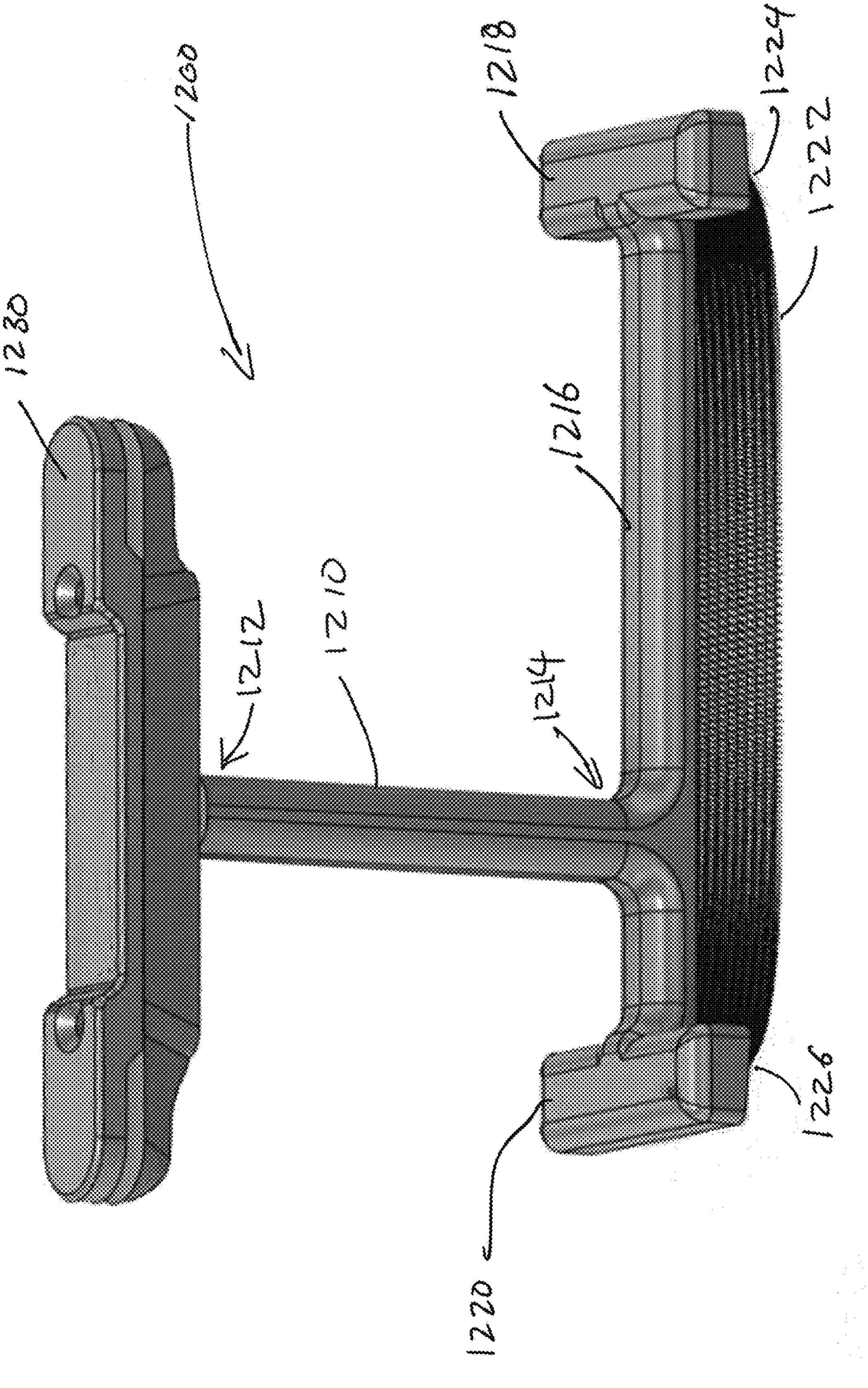
FIG. 12 is a side perspective view of an exemplary embodiment of an aspect of the instant disclosure showing an embodiment of a percussive attachment having a percussive sound-generating element bridge with one or more resilient elongate percussive sound-generating elements.
Figure 13:
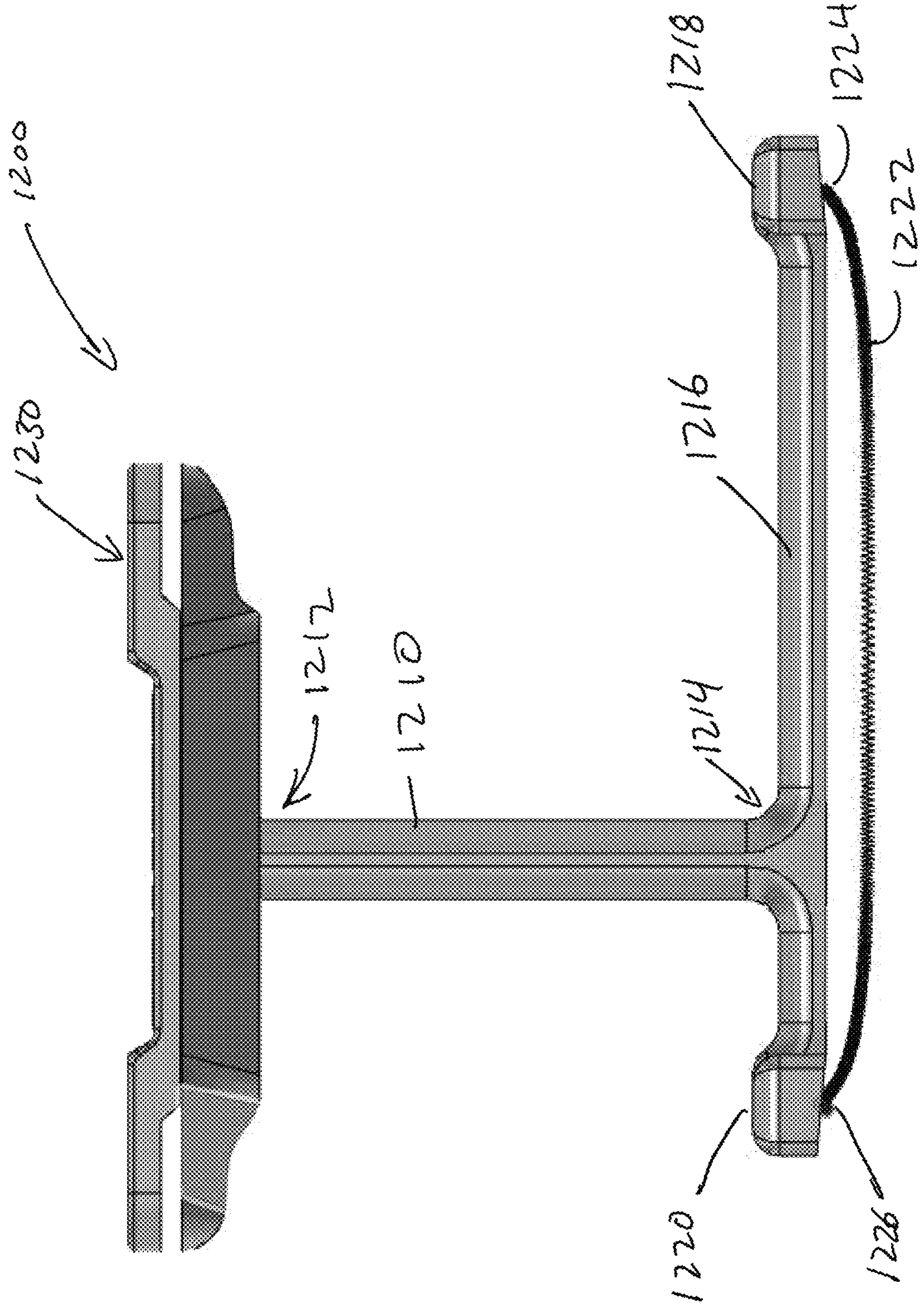
FIG. 13 is a side elevational view of the exemplary embodiment of FIG. 12.

Turning now to FIGS. 12 and 13, in certain embodiments, the percussive apparatus 1200, for example, may be coupled to the sound hole of a hollow-bodied instrument in a manner similar to the embodiments shown in FIGS. 1 to 11 via a coupling region 1230 such that a body portion 1210 of the percussive attachment 1200 may be situated inside (not shown for simplicity with regard to the instant embodiment) the hollow body of the instrument. For example, although shown with regard to the embodiments of FIGS. 12 and 13, the body portion 1210, when coupled to a sound hole as shown in other embodiments disclosed herein, extends inwardly (i.e. inside the hollow body of a guitar). The body portion 1210 has a first end region 1212 and a second end region 1214, where the first end region 1212 is coupled to, or is integral with, a portion of the coupling region 1230 and the second end region is coupled to, or is integral with, a percussive sound-generating element bridge 1216. In use, the percussive sound-generating element bridge 1216 is maintained, in some embodiments at desired distance from an inner surface of the hollow-bodied instrument, that being such that the percussive sound-generating element bridge 1216 is not in direct contact with an inner surface. In some embodiments, it may be desirable for the percussive sound-generating element bridge 1216 to be in contact with an inner surface of the hollow-bodied instrument. The percussive sound-generating element bridge 1216 has a first end region 1218 and a second end region 1220 where one or more flexible and/or resilient percussive sound-generating elements 1222, each having a respective first end 1224 and a second end 1226 are coupled respectively to near first end region of the percussive sound-generating element bridge 1218 and the near the second end region of the percussive sound-generating element bridge 1220, thus being strung there-across the percussive sound-generating element bridge 1216.

In various embodiments, the one or more flexible and/or resilient percussive sound-generating elements 1222, may be one or more, or a combination of snare wires, snare cords, snare cables, wires, a strings, cords, or cables. In some embodiments such as in the case of one or more snare wires, or an array of snare wires, the snare wires may be in biased contact with an inner surface of the hollow body, as shown, for example in FIGS. 1 to 11. In other embodiments, one or more flexible and/or resilient percussive sound-generating elements 1222 are positioned in the hollow-bodied instrument, by virtue of body portion 1222 such that they may be selectively and reversibly in contact with an inner surface of the hollow-body. In the various embodiments, such configurations of a percussive apparatus inside a hollow body or resonance chamber may allow the percussive apparatus 1200 to utilize the resonance properties of an instrument for generating and/or enhancing musical sound. Furthermore, placement inside the body of a stringed instrument such as that show at 160 in FIG. 1 may allow for freedom of movement of a musician for playing an instrument, rather than impeding the musician's motion, as may be the case if a percussive sound-generating element(s) was on an outer surface of the instrument. In accordance with various aspects, the percussive apparatus 1200 may be contactable or in contact with various inner surfaces of a stringed instrument. In some embodiments, different orientations of the device may allow for a user to vary which outer surfaces of the instrument may be struck while the device is in use in order to provide, for instance, various musical sounds or tonalities.

As with other embodiments disclosed herein and shown in FIGS. 1 to 11, although not shown in FIGS. 12 and 13 specifically for simplicity, the coupling region 1230 may take the form and be adapted from that shown in FIGS. 12 and 13 so as to be operably coupled with the sound hole of the hollow-bodied instrument by a base portion 234 or with the end region 234 or the body 210 and a movable plate portion 230 for receiving therebetween an edge region of the sound hole and maintaining the percussion apparatus in a desired location within the resonating chamber by a compression fit (see FIG. 2), a clamping mechanism 430 operable for engaging inner and outer surfaces of the hollow body portion through the sound hole and maintaining the percussion apparatus in a desired location within the resonating chamber by a compression fit (see FIGS. 4 and 6), biasable portion 532*a* and 532*b* for engaging with an inner rim of the sound hole and maintaining the percussion apparatus in a desired location within the resonating chamber by a friction fit (see FIG. 5), or other suitable means as may be determined to couple the percussive apparatus 1200 within the sound hole, include fixation, for use.

Additionally, as with other embodiments disclosed herein and shown in FIGS. 1 to 11, although not shown in FIGS. 12 and 13 specifically for simplicity, the body portion may be angularly adjustable by means as may be determined by those of skill in the art, including a hinge mechanism 718 similar to that shown in FIG. 7 intervening the body portion 710 and the coupling region 730. The body portion of the embodiment of FIGS. 12 and 13 may also be adjustable in length by means as may be determined by one of skill in the art, including the embodiment of FIG. 8 where the body portion 810 may be telescopic between the coupling region 830 and distal end.

Furthermore, as with other embodiments disclosed herein and shown in FIG. 11, although not shown in FIGS. 12 and 13 specifically for simplicity, the second end 1214 of the body portion 1210, may comprise biasing means (see, for example 1120 of FIG. 11) to further provide a spring force to maintain or reestablish contact between a length of a portion of the percussive sound-generating elements 1222 and the inner surface of the hollow-bodied instrument when in use. Accordingly, a spring may comprise a designated length and biasing force selected based on, for instance, the system configuration (e.g., attachment length, instrument dimensions, or the like), to provide a designated angular orientation of the percussive sound-generating elements relative the inner surface when the attachment is reversibly or permanently installed. Similarly, a spring mechanism may be selected based on a desired spring force to be applied to percussive elements or an attachment plate coupled therewith, for instance to affect a sound volume or quality during operation.

While various embodiments herein described may present various features and/or components individually, the skilled artisan will appreciate that any one or more of the various features discussed may be employed in combination without departing from the scope of the disclosure. For instance, any one of the various means disclosed for coupling a percussive attachment in a reversible attachment at or near a sound hole of a stringed instrument may be employed in combination with any pivotable or telescopic body portion, wherein the body portion may be coupled to a single percussive sound-generating elements, or array thereof, via a connector plate.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A percussion apparatus for use within a resonating chamber, the resonating chamber comprising a hollow body portion having a sound hole;

the percussion apparatus having a percussion apparatus body portion and a percussive sound-generating portion;

said percussion apparatus body portion having a first end configured for coupling with the hollow body portion through the sound hole and a second end configured for operably coupling with the percussive sound-generating portion;

said percussive sound-generating portion comprising a percussive sound-generating element bridge;

said percussive sound-generating element bridge having a first end region and a second end region;

one or more resilient elongate percussive sound-generating elements each having a first end and a second end coupled respectively to the percussive sound-generating element bridge near the first and second end regions of the percussive sound-generating element bridge; and wherein a portion of said one or more resilient elongate percussive sound-generating elements is, in use, able to selectively and reversibly contact an inside surface of the hollow body.

2. The percussion apparatus of claim 1, wherein the resonating chamber is a guitar, a violin, a cello, a bass, a double bass, a viola, a ukulele, a mandolin, a lute, a zither, or a banjo.

3. The percussion apparatus of claim 1, wherein said one or more resilient elongate percussive sound-generating elements is at least one of a snare wire, a snare cord, a snare cable, a wire, a string, a cord, or a cable.

4. The percussion apparatus of claim 1, wherein said percussion apparatus body portion has a length and an angular orientation such that in operation, said portion of said one or more resilient elongate percussive sound-generating elements is biased in reversible communication with the inside surface of the hollow body.

5. The percussion apparatus of claim 4, wherein said percussion apparatus body portion is coupled to said percussive sound-generating portion at a connection site.

6. The percussion apparatus of claim 5, wherein said connection site comprises a pivotable joint intervening said percussion apparatus body portion and said percussive sound-generating portion.

7. The percussion apparatus of claim 6, wherein said pivotable joint is configured to allow a user-defined angular orientation to said one or more resilient elongate percussive sound-generating elements such that a length of the portion of said one or more resilient elongate percussive sound-generating elements biased in reversible communication with the inside surface of the resonating chamber may be defined by a user.

8. The percussion apparatus of claim 5, wherein said connection site further comprises a means for biasing a portion of the one or more resilient elongate percussive sound-generating to be in contact with the inside surface of the hollow body.

9. The percussion apparatus of claim 8, wherein the means for biasing is a spring mechanism.

10. The percussion apparatus of claim 1, wherein the length of said percussive apparatus body portion is adjustable.

11. The percussion apparatus of claim 1, wherein the angular orientation of said percussive body portion adjustable.

12. The percussion apparatus of claim 1, wherein said first end of said percussion apparatus body portion, configured for reversibly coupling with the hollow body portion, comprises a base portion and a movable plate portion for receiving therebetween an edge region of the sound hole and maintaining the percussion apparatus in a desired location within the resonating chamber by a compression fit.

13. The percussion apparatus of claim 1, wherein said first end of said percussion apparatus body portion, configured for reversibly coupling with the hollow body portion, comprises a clamp operable for engaging inner and outer surfaces of the hollow body portion through the sound hole and maintaining the percussion apparatus in a desired location within the resonating chamber by a compression fit.

14. The percussion apparatus of claim 1, wherein said first end of said percussion apparatus body portion, configured for reversibly coupling with the hollow body portion, comprises a biasable portion for engaging with an inner rim of the sound hole and maintaining the percussion apparatus in a desired location within the resonating chamber by a friction fit.

15. The percussion apparatus of in claim 14, wherein the biasable portion is compressible for insertion into the sound hole and biased to a decompressed conformation so as to exert pressure on the inner rim of the sound hole and maintain the percussion apparatus in a desired location within the resonating chamber by a friction fit.

16. A method for generating a percussive sound with a hollow-bodied stringed instrument having a sound hole, the method comprising:

reversibly coupling a percussion apparatus of claim 1 with the hollow body portion via the sound hole.

17. The method of claim 16, further comprising causing the portion of said one or more resilient elongate percussive sound-generating elements to separate from an inner surface and return to communication with the inner surface under a bias.

18. The method of claim 17, wherein causing the portion of said one or more resilient elongate percussive sound-generating elements to separate from the inner surface and return to communication with the inner surface under said bias is performed by impact or sudden movement of the resonating chamber.

* * * * *